(12) United States Patent
Bartz et al.

(10) Patent No.: US 11,424,087 B2
(45) Date of Patent: Aug. 23, 2022

(54) ELECTRICAL SWITCHING DEVICE

(71) Applicant: Siemens Energy Global GmbH & Co. KG, Munich (DE)

(72) Inventors: Michael Bartz, Berlin (DE); Alexander Hartung, Berlin (DE); Martin Krehnke, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/965,098

(22) PCT Filed: Dec. 27, 2018

(86) PCT No.: PCT/EP2018/097016
§ 371 (c)(1),
(2) Date: Jul. 27, 2020

(87) PCT Pub. No.: WO2019/145110
PCT Pub. Date: Aug. 1, 2019

(65) Prior Publication Data
US 2021/0043395 A1 Feb. 11, 2021

(30) Foreign Application Priority Data

Jan. 25, 2018 (DE) .............................. 102018201151

(51) Int. Cl.
*H01H 3/46* (2006.01)
*H01H 33/662* (2006.01)
(Continued)

(52) U.S. Cl.
CPC ................ *H01H 3/46* (2013.01); *F16J 15/50* (2013.01); *H01H 33/662* (2013.01);
(Continued)

(58) Field of Classification Search
CPC .......... H01H 3/46; H01H 3/36; H01H 33/662; H01H 33/666; H01H 33/64;
(Continued)

(56) References Cited

U.S. PATENT DOCUMENTS 3,440,377 A * 4/1969 Wesoloski ....... H01H 33/66261
218/135
5,191,180 A  3/1993 Kitamura et al.
(Continued)

FOREIGN PATENT DOCUMENTS

CN      103165337 A    6/2013
CN      105321766 A    2/2016
(Continued)

OTHER PUBLICATIONS

PCT International Search Report and Written Opinion of International Searching Authority dated Apr. 17, 2019 corresponding to PCT International Application No. PCT/EP2018/097016 filed Dec. 27, 2018.

*Primary Examiner* — William A Bolton
(74) *Attorney, Agent, or Firm* — Laurence A. Greenberg; Werner H. Stemer; Ralph E. Locher (57) ABSTRACT

An electrical switching device includes a kinematic chain, a first encapsulation housing, a movable switching contact piece and a fixed switching contact piece. The movable switching contact piece is movable by the kinematic chain which penetrates the first encapsulation housing in a fluid-tight manner. The kinematic chain penetrates the first encapsulation housing in a linearly movable manner.

13 Claims, 5 Drawing Sheets

(51) Int. Cl.
  *H01H 33/666*  (2006.01)
  *F16J 15/50*  (2006.01)

(52) U.S. Cl.
  CPC ... *H01H 33/666* (2013.01); *H01H 2033/6623* (2013.01); *H01H 2033/6665* (2013.01); *H01H 2033/6667* (2013.01)

(58) Field of Classification Search
  CPC .. H01H 33/66207; H01H 33/42; H01H 33/56; H01H 33/66; H01H 2033/66223; H01H 2033/6623; H01H 2033/6665; H01H 2033/6667; H01H 2033/66246; H01H 2033/66253; H02B 13/0354; F16J 15/50
  USPC ........ 200/329; 218/120, 134, 135, 138, 140, 218/155
  See application file for complete search history.

(56) References Cited

U.S. PATENT DOCUMENTS

| | | | |
|---|---|---|---|
| 6,927,356 B2* | 8/2005 | Sato | H01H 33/666 218/154 |
| 7,650,816 B2 | 1/2010 | Chyla et al. | |
| 8,110,770 B2* | 2/2012 | Ichikawa | H01H 33/666 218/134 |
| 8,963,037 B2* | 2/2015 | Nakada | H01H 33/42 218/120 |
| 9,082,572 B2* | 7/2015 | Yoshida | H01H 33/6606 |
| 9,666,392 B2 | 5/2017 | Gruenler et al. | |
| 2008/0197008 A1* | 8/2008 | Einschenk | H01H 33/6661 200/48 R |
| 2008/0302765 A1* | 12/2008 | Renz | H01H 33/66207 218/134 |
| 2013/0057083 A1 | 3/2013 | Donzel et al. | |
| 2014/0124480 A1* | 5/2014 | Yoshida | H01H 33/6606 218/134 |
| 2014/0209569 A1* | 7/2014 | Miyatake | H01H 33/662 218/134 |

FOREIGN PATENT DOCUMENTS

| | | |
|---|---|---|
| DE | 1690061 A1 | 1/1971 |
| DE | 4123710 A1 | 1/1992 |
| DE | 4131827 A1 | 3/1993 |
| DE | 102013210136 A1 | 12/2014 |
| DE | 102014205915 A1 | 10/2015 |
| DE | 102016205011 A1 | 9/2017 |
| EP | 2461338 A1 | 6/2012 |
| JP | H1064381 A | 3/1998 |
| JP | H11146514 A | 5/1999 |
| JP | 2006093005 A | 4/2006 |
| WO | WO2004/092604 A1 | 10/2004 |

\* cited by examiner

ELECTRICAL SWITCHING DEVICE

BACKGROUND OF THE INVENTION

Field of the Invention

The invention relates to an electrical switching device comprising a switching contact piece that may be driven by means of a kinematic chain, said switching contact piece being surrounded by a first encapsulation housing that is penetrated in a fluid-tight manner by the kinematic chain.

An electrical switching device is disclosed by way of example in the international publication WO 2004/092604 A1. This publication describes a high-voltage power switch that comprises a kinematic chain for transmitting a movement. Part of the kinematic chain is a shaft, which is guided in a sealed manner through a wall of the high-voltage power switch. In order to drive the shaft, this kinematic chain comprises a deflecting lever having an adjusting device.

A construction of this type namely renders possible a simplified procedure of adjusting the kinematic chain via the adjusting device. However, it is necessary to convert a linear movement of a drive into a rotary movement in order to subsequently in turn convert this rotary movement into a linear movement of a contact piece. In this respect, the embodiment of the kinematic chain and therefore the electrical switching device becomes more expensive as a result of the additional components. Furthermore, owing to the plurality of components that may move relative to one another in the kinematic chain, the kinematic chain is to be checked after a number of switching procedures and where applicable to be newly adjusted.

SUMMARY OF THE INVENTION

Consequently, the object of the invention is to provide an electrical switching device which cost-effectively renders it possible even after a large number of switching procedures to provide a stable transmission of a drive movement to a drivable switching contact piece.

In accordance with the invention, the object in the case of an electrical switching device of the type mentioned in the introduction is achieved by virtue of the fact that the kinematic chain penetrates the first encapsulation housing in a linearly movable manner.

An electrical switching device is used to switch a current path which is used to transmit electrical energy. By way of example, for this purpose the current path comprises a drivable switching contact piece, which may be moved by way of example relative to a fixed switching contact piece. A galvanic contacting arrangement of the switching contact pieces may be provided during a switching-on procedure by means of an ability of the switching contact pieces to move relative to one another. It is possible during a switching-off procedure to interrupt the galvanic contacting arrangement of the switching contact pieces that may move relative to one another. The impedance within the current path that is to be switched may consequently be changed by means of an electrical switching device. In order to drive at least one of the switching contact pieces, a movement, which typically starts from a drive device, is accordingly coupled to the at least one drivable switching contact piece. A kinematic chain may be used in order to transmit a movement from the drive device to a drivable switching contact piece. The drivable switching contact piece generally comprises an electric potential that deviates with respect to the drive device owing to the switching procedure of an electrical current. It is preferred that the kinematic chain comprises an electrically insulating section in its extent with the result that faults to ground, short-circuits, stray currents etc. are prevented via the kinematic chain.

Depending upon the requirement, the electrical switching device may be designed for different switching powers. By way of example, the electrical switching device may be a disconnecting switch which is only to be switched in the non-energized state. However, the electrical switching device may also be a load switch or a power switch. A power switch is capable of controlling both measuring currents as well as short-circuit currents.

The drivable switching contact piece may be by way of example a switching contact piece, which is surrounded by an electrically insulating fluid in particular a gas. Materials containing fluoride, by way of example, such as sulfur hexafluoride, fluorinated ketones, fluoronitriles etc. and also other materials such as carbon dioxide, nitrogen, so-called technical air and also mixtures may be used as electrically insulating fluids. By way of example, the encapsulation housing may provide in its inner housing an electrically insulating fluid and therefore a separate atmosphere around the drivable switching contact piece. By way of example, fluid materials such as insulating oils or esters may also be used as electrically insulating fluids. In the sense of this document, the term "an electrically insulating fluid" is also understood as a vacuum or a negative pressure that is close to the ideal vacuum in the interior of an encapsulation housing. In the case of a vacuum, the "fluid" that is located in said vacuum in the absence of a free load carrier is suitable in a particular manner in order to counteract a burning effect of an electric arc. The embodiment of the drivable switching contact piece in this case may vary depending upon the choice of the electrically insulating fluid. The drivable switching contact piece may be formed by way of example in a socket shape or bolt shape. However, it may also be provided that the drivable switching contact piece comprises a plate-like contact surface, which may be pressed at an obtuse angle against a mating contact piece. In order to achieve a reliable electrical contacting arrangement, a mating contact piece that is associated with the drivable switching contact piece comprises a shape that preferably complements the shape of the drivable switching contact piece. In order to control particularly high switching powers, the drivable switching contact piece may also comprise different sections, by way of example a pre-contacting section and also a main contacting section. Arcs are preferably guided at the pre-contacting section with the result that a loss of contact material preferably occurs at said pre-contacting section, as a result of which a main contacting section of the drivable switching contact is protected against a loss of contact material.

A linear penetrating arrangement of the kinematic chain through the encapsulation housing comprises the advantage that a complex procedure of reshaping a movement merely for the purposes of transmitting the movement through a wall is avoided. As a consequence, the kinematic chain may be simplified in its construction. Furthermore, new possibilities are provided in order to provide a sealing effect of the kinematic chain with respect to the first encapsulation housing. By way of example, the kinematic chain itself may at least in part close an opening in the first encapsulation housing, wherein a linear sealing arrangement may be assumed by means of a seal. It is possible by way of example to use a telescopic section as a seal, which embodies a fluid-tight connection between the kinematic chain and the first encapsulation housing.

A further advantageous embodiment may provide that the kinematic chain, in particular a switching rod of the kinematic chain, is guided on the first encapsulation housing so that said switching rod may move in a linear manner.

It is possible by means of a linear guiding arrangement of the kinematic chain for said kinematic chain to transmit a movement in a simple form into the interior of the first encapsulation housing. In this case, the kinematic chain may preferably comprise a switching rod, wherein the switching rod is mounted so that it may move in a linear manner along the switching rod longitudinal axis. A supporting arrangement of the kinematic chain, in particular the switching rod, in this case may be provided on the first encapsulation housing. As a consequence, it is rendered possible to easily construct a kinematic chain, which is protected from bowing and bulging or further undesired movements. Furthermore, it is possible by means of the guiding arrangement on the first encapsulation housing to provide a defined relative position between the kinematic chain and first encapsulation housing. This facilitates the embodiment of a seal between the kinematic chain and the encapsulation housing. In particular, it is possible by means of the guiding arrangement on the first encapsulation housing to prevent fatigue of a seal.

A further advantageous embodiment may provide that a reversibly deformable section, in particular a bellows, assumes a linear sealing arrangement.

A linear sealing arrangement may be produced by means of using a reversibly deformable section. A reversibly deformable section comprises the advantage that different regions of the reversibly deformable section may be grasped in an angular-fixed manner, wherein a relative movement may be provided between the holding arrangements that are fastened in an angular-fixed manner. As a consequence, it is possible to produce a wall that is in itself sealed in a closed manner, which on one side connects the first encapsulation housing and on the other side is connected to the kinematic chain, in particular to a switching rod. By way of example, the reversibly deformable section may be connected in a fluid-tight manner to the kinematic chain in a cuff-like manner, in particular to a switching rod. The cuff may preferably be formed from a fluid-tight material, in particular a metal material or a metal coating. The reversibly deformable section may be embodied in a particularly advantageous manner in the shape of a bellows. The bellows may experience a surface enlargement by way of example by means of a folding/corrugation arrangement with the result that a reversible deformation is provided via a plurality of corrugations so as to realize a large relative movement, by way of example large strokes with the result that an overload at specific sites of the reversibly deformable section is counteracted. By way of example, the bellows may be embodied in the manner of a sleeve, which may be connected in a fluid-tight manner at the end faces that are arranged on opposite sides on one side to the kinematic chain and on the other side to the first encapsulation housing. By way of example, the reversibly deformable section may be provided so as to connect the same section to the kinematic chain or to the first encapsulation housing using flanges. The flanges may be connected by way of example in a firmly bonded manner to the reversibly deformable section, wherein the flanges may be in turn embodied by way of example by means of a screw connection, a fluid-tight connection to the switching rod and/or to a corresponding region of the first encapsulation housing, said region comprising a complementary shape.

A further advantageous embodiment may provide that the first encapsulation housing comprises a collar in which the kinematic chain, in particular the switching rod, is guided so that said switching rod may displace in a linear manner.

The first encapsulation housing may comprise a collar. It is preferred that the encapsulation housing comprises a collar that delimits an opening in said encapsulation housing with the result that it is rendered possible to deflect or guide the kinematic chain, in particular the switching rod. On the one hand, a stable axial guiding arrangement is achieved by means of an embodiment having a complementary shape of the kinematic chain and collar, on the other hand the section that is to be sealed between the kinematic chain and the encapsulation housing is rendered possible, in this case in particular with respect to the collar, in a simplified manner. The annular gap that is provided between the collar and the kinematic chain, in particular when a switching rod is used, may be used in order by way of example to arrange the linear sealing arrangement. As a consequence, the linear sealing arrangement is held in a region, which experiences a mechanical protection from the switching rod and the collar. At the same time, the guiding arrangement of the kinematic chain and therefore where applicable a reversible deformation of a reversibly deformable section is achieved. An undesired bowing and bulging is therefore prevented by means of the collar. In this case, the collar may delimit an opening within the encapsulation housing and therefore may offer a frame for said opening. The collar consequently extends essentially in a transverse manner with respect to an opening in the encapsulation housing with the result that the collar may preferably be drawn into the shell contour of the encapsulation housing. However, the collar may also extend outwards over the shell contour of the encapsulation housing or may continue both in the interior as well as outside of the shell contour of the encapsulation housing. The collar may represent a part of a fluid-tight barrier in order to prevent an electrically insulating fluid escaping from the first encapsulation housing.

A further advantageous embodiment may provide that the collar is part of a pocket in the first encapsulation housing.

The first encapsulation housing comprises a shell contour, which determines the outer limit of the first encapsulation housing. The collar may be part of a pocket, which extends into the interior of the first encapsulation housing and therefore reduces the receiving space in the interior of the first encapsulation housing. Accordingly, a space is provided enclosed in the first encapsulation housing in order to insert the kinematic chain into the interior of the encapsulation housing in a mechanically protected manner and by way of example also to position a reversibly deformable section. Consequently, on the one hand a stable guiding arrangement of the kinematic chain is provided by means of the linear guiding arrangement on the housing, on the other hand a mechanical and also where applicable dielectrically shielded space is provided for the arrangement of the kinematic chain by means of recessing the collar so as to embody a pocket. The pocket may be used as a passage for the kinematic chain into the interior of the first encapsulation housing.

Advantageously, it may be provided in this case that the pocket comprises a modifiable partition.

A depression or a recess is formed in the first encapsulation housing by means of a pocket, wherein in particular the depth of the pocket may be changed by means of a modifiable partition. The ability to change the partition may be based upon its an ability to be displaced. By way of example, the partition may be formed by means of a section of the kinematic chain, in particular a section of a switching rod, wherein the partition may also be used as a guiding arrangement of the kinematic chain. By way of example, the switching rod may comprise a piston-type section, which is guided into the collar in a slidable manner. The section that is guided in a slidable manner may consequently form the partition, wherein during a relative movement of the drivable switching contact piece the partition moves along the collar and therefore varies the depth of the pocket.

Advantageously, it may be provided that the collar protrudes into a flange opening of the first encapsulation housing.

The first encapsulation housing may be constructed in a different manner. By way of example, the first encapsulation housing may be embodied in an essentially rotationally symmetrical manner, wherein the first encapsulation housing for this purpose by way of example comprises a hollow cylindrical, in particular electrically insulating base body. In order to complete the hollow cylindrical base body of the first encapsulation housing, it is possible for flange fittings to be arranged on the end side of said encapsulation housing, said flange fittings being connected in a fluid-tight manner to the base body. As a consequence, an end face-side closure and an end face-side encompassing arrangement of the base body is provided with the fitting flanges. The fitting flanges in this case comprise a flange opening into which the collar may protrude. The collar may be connected in a fluid-tight manner to a flange. As a consequence, a possibility is provided for guiding a movement on the end face side of the first encapsulation housing into the interior of the first encapsulation housing. In particular on a fitting flange of the first encapsulation housing, it is possible by way of example to provide a collar in the form of a tubular insert, which protrudes into the interior of the first encapsulation housing. Accordingly, the collar may be provided on a free end, which protrudes in the direction of the interior of the first encapsulation housing, a fluid-tight connection to a reversibly deformable section, in particular in the form of an essentially hollow cylindrical folding bellows. In this case, the folding bellows extend, surrounded by the collar, within the collar. Using the other end of said folding bellows, it is possible to connect the reversibly deformable section to a switching rod, which is likewise encompassed by the collar. The switching rod may be connected for this purpose to the reversibly deformable bellows in a fluid-tight manner. The fluid-tight connection between the switching rod and the reversibly deformable section may preferably be provided at the site on the switching rod where the switching rod comprises a piston-type bulging, wherein the piston-type bulging is in slidable contact with the interior of the collar. As a consequence, a pocket is formed on the electrical switching device in the first encapsulation housing, said pocket comprising a movable partition.

Advantageously it may be provided in this case that the reversibly deformable section extends between the switching rod and the collar.

Advantageously, an annular gap may remain between the switching rod and also the collar, and the reversibly deformable section extends within said annular gap. In particular when using an essentially hollow cylindrical folding bellows, the folding of the folding bellows may be selected in such a manner that the convex sections of the folding bellows on the inner cladding side and/or outer cladding side experience respectively a radial supporting arrangement on the collar or on the switching rod. As a consequence, the folding of the reversibly deformable section is further supported, wherein a radially narrow structure is formed, which is used as a permanent fluid-tight connection between the switching rod, collar and therefore a fluid-tight closure of an opening in the first encapsulation housing.

Advantageously, it may be provided that the switching rod, the reversibly deformable section and the collar are arranged oriented coaxially with respect to one another.

Rotationally symmetrical structures are suitable in order to counteract an occurrence of part discharges in the region of high electrical fields. Peaks at which load carriers could detach are avoided by means of curvatures and circular structures. Accordingly, a rotationally symmetrical switching rod, a rotationally symmetrical reversibly deformable section and also a rotationally symmetrical collar are advantageous, wherein these should preferably be arranged oriented coaxially with respect to one another. In this case, the coaxial orientation should be provided in such a manner that the collar, the reversibly deformable section and also the switching rod at least in sections encompass one another or are immersed into one another.

Advantageously, it may be provided that a bellows guiding arrangement is arranged between the switching rod and the reversibly deformable section and/or between the reversibly deformable section and the collar.

A relative movement between the switching rod and the collar and a deformation of the reversibly deformable section, which is triggered as a consequence, leads to an axial displacement of the individual elements relative to one another. It is possible by means of using a bellows guiding arrangement to compensate production tolerances or dimension deviations between the collar, the reversibly deformable section and the switching rod. The bellows guiding arrangement may fill by way of example a remaining annular gap between the switching rod and the reversibly deformable section. As a consequence, the cross-section of the switching rod is enlarged, wherein the reversibly deformable section, in particular convex regions of a folding bellows, may be braced on the bellows guiding arrangement. As a consequence, the switching rod is protected against mechanical loading that could lead by way of example to abrasions. The bellows guiding arrangement preferably comprises a friction reducing characteristic. By way of example, the bellows guiding arrangement is produced from an electrically insulating material, such as for example polytetrafluoroethylene or polyethylene. It is preferred that the bellows guiding arrangement is fixed in a manner that is fixed relative to the switching rod or to the collar with the result that the reversibly deformable section may slide along on a counter bearing, which is formed by means of the bellows guiding arrangement.

A further advantageous embodiment may provide that the first encapsulation housing surrounds a second encapsulation housing, wherein a first pressure prevails in the first encapsulation housing and a second pressure prevails in the second encapsulation housing, wherein the two pressures differ from one another.

Use of a first encapsulation housing and also a second encapsulation housing, which extends in the interior of the first encapsulation housing, renders it possible to increase the dielectric strength of the electrical switching device. By way of example, the second encapsulation housing may be filled with a fluid, which is different from a fluid that is located in the interior of the first encapsulation housing. As a consequence, the possibility is provided of achieving a cascade type control of a voltage distribution. By way of example, the first encapsulation housing may be filled with an electrically insulating fluid, which surrounds the second encapsulation housing, where conversely by way of example an electrically insulating gas is arranged in the second encapsulation housing. As a consequence, furthermore a protective function for the second encapsulation housing is provided since this second encapsulation housing is protected by means of the first encapsulation housing against a direct external mechanical loading. In one preferred variant, the first encapsulation housing comprises an electrically insulating fluid, in particular a gas, which is influenced using a first pressure, where conversely a negative pressure, in particular a vacuum, is located in the second encapsulation housing with the result that the pressure in the first encapsulation housing is preferably higher than the pressure in the interior of the second encapsulation housing.

In the case of an arrangement of a second encapsulation housing within the first encapsulation housing, it may be advantageously provided that the kinematic chain penetrates a wall of the first encapsulation housing and also a wall of the second encapsulation housing. It may preferably be provided that in this case the wall of the first encapsulation housing and also the wall of the second encapsulation housing are penetrated in a linear sealed manner. Advantageously, it may be provided that the two encapsulation housings are penetrated respectively aligned along an axis. It is therefore possible to provide a mechanically simplified arrangement of the encapsulation housing and also to transmit the movement from a drive device that is arranged outside both of the first as well as outside of the second encapsulation housing. A sealing arrangement may be provided in a linear sealing manner both in the case of the kinematic chain penetrating through the first encapsulation housing as well as in the case of the kinematic chain penetrating through the second encapsulation housing. In particular if a reversibly deformable section is used, it is possible to provide that during a movement of the kinematic chain the reversible deformation occurs at the first encapsulation housing in the opposite direction than as the kinematic chain passes through the second encapsulation housing. In other words, whereas a reversibly deformable section is extended during the passage through the first encapsulation housing, conversely a reversibly deformable section is compressed at the second encapsulation housing. In an ideal case, compression forces and extension forces compensate on the two reversibly deformable sections with the result that, where applicable supported by means of a pressure difference, drive energies that are not required in order to overcome pressure differences are reduced.

Advantageously, it may be provided that the first pressure is higher than or identical to the second pressure.

In particular in the case of using a negative pressure in the second encapsulation housing, it may therefore be possible to generate a stepped reduction or a stepped transition of the pressure ratios over the two encapsulation housings. As a consequence, each of the encapsulation housings is to be designed respectively only in relation to the pressure difference. In contrast to an individual encapsulation housing, this has the advantage that oversized pressure containers are avoided. Furthermore, it is possible by means of the "encapsulation housing in the encapsulation housing" concept to optimize the materials that are to be used in order to embody the first and also the second encapsulation housing. The second encapsulation housing is provided with a defined surrounding area owing to the use of the first encapsulation housing with the result that this second encapsulation housing by way of example may be optimized in relation to electrically insulating parameters without it being necessary to take into account the external surrounding area of the first encapsulation housing. The first encapsulation housing shields the second encapsulation housing against environmental influences.

A further advantageous embodiment may provide that a pressure that surrounds the first encapsulation housing is lower than or identical to the first pressure, wherein the pressure that surrounds the first encapsulation housing is higher than or identical to the second pressure.

It is possible by means of using a pressure in the first encapsulation housing, which is higher both with respect to the pressure in the second encapsulation housing as well as with respect to the surrounding area of the first encapsulation housing, to provide a pressure in the second encapsulation housing, which is reduced both with respect to the first encapsulation housing as well as with respect to the pressure of the surrounding area of the first encapsulation housing. Accordingly, in particular during a switching-off movement a movement is supported by means of the pressure cascade that is provided since the differential pressures in particular compensate during a switching-off movement with the result that in an ideal case, a relative movement that is entirely free of differential pressure may be transmitted by means of the kinematic chain. A drivable switching contact piece that is arranged in the second encapsulation housing is also arranged within the first encapsulation housing owing to the "encapsulation housing within the encapsulation housing" concept. In particular when using a vacuum switching chamber in order to embody the second encapsulation housing, it is therefore possible to use a low-energy drive device in order to set the drivable switching contact piece into a movement. It is therefore possible to omit unnecessary drive energy that would be necessary for example in order to overcome pressure pulses.

A further advantageous embodiment may provide that the linear movable switching rod is controlled via a knee lever transmission of the kinematic chain.

It is possible by means of using a knee lever transmission by way of example to convert energy, which is stored by means of a spring-operated drive in a preloaded spring, into a movement for the drivable switching contact piece. It is possible by means of the knee lever transmission to provide a changing transmission ratio in dependence upon the extended position of the knee lever transmission. In particular near to the extended position, it is possible to achieve a low transmission ratio as a result of which, despite a comparatively large movement of the drive device, this large movement only leads to a small movement on the drivable switching contact piece owing to the extended lever ratios. Conversely, it is possible to achieve a comparatively large movement on the drivable switching contact piece in the case of including an acute angled position of the knee lever transmission with a small movement of the drive device. The opposite is the case with the necessary torques, which must be provided in order to generate a movement shortly prior to or after the extended position on the knee lever or shortly prior to or after an acute angled position of the knee lever transmission. It is therefore possible by way of example to reliably latch the drivable switching contact piece in the extended position of the knee lever transmission since a movement that is necessary in order to achieve a latching arrangement is only transmitted to the drivable switching contact piece to a small extent. In particular during a switching-off procedure, the use of the extended position offers the advantage that the drivable switching contact piece is assisted in snapping free by means of the knee lever transmission collapsing with the result that a large snapping torque is provided on the drivable switching contact piece. The knee lever transmission or a coupling of the knee lever transmission may preferably be connected in a pivotable manner to a switching rod of the kinematic chain. In particular, the coupling may be connected to the section of the switching rod, which embodies a fluid-tight barrier and is therefore used as a linear sealing arrangement of the kinematic chain with respect to the first encapsulation housing.

Advantageously it may be provided that in the switched-on state of the electrical switching device the knee lever transmission of the kinematic chain is in the extended position.

In the switched-on state, the kinematic chain or the knee lever transmission of the kinematic chain is in the extended position. As a consequence, an undesired collapse of the knee lever transmission in the switched-on position is impeded. In particular, the extended position may be used in such a manner that holding forces for positioning the drivable switching contact piece in the switched-on position are transmitted via a line of the knee lever of the knee lever transmission.

It is possible to use a conventional spring-operated drive by means of using an extended position and also using a knee lever transmission. A spring-operated drive comprises a preloaded spring, which provides energy to the drive of a drivable switching contact piece. The preloaded spring is initially to be loaded for this purpose. In this case, the preloaded spring may provide energy for multiple switching procedures by way of example an OFF-ON-OFF cycle. In this case, the drive device may be used for the purpose of defining the position of the drivable switching contact piece in the switched-on state and also in the switched-off state. In order to achieve a switched-off state, the drive device may comprise a stop against which the kinematic chain runs with the result that an overstroke of the drivable switching contact piece is prevented by means of the stop. During a switching-on procedure, the drive device may comprise a corresponding latching arrangement in order to specify the switched-on position of the drivable switching contact piece. In this case, the latch may be embodied in such a manner that by way of example a slight release of the energy that is stored in the preloaded spring is used in order to secure the latching arrangement. The preloaded spring is also released as the latching arrangement is opened, as a result of which said preloaded spring at least in part releases the energy stored in said spring. This energy is converted by means of the drive device into a movement, which is transmitted via the kinematic chain to the drivable switching contact piece (in particular for a switching-off procedure).

An exemplary embodiment of the invention is illustrated schematically below and afterwards further described.

DETAILED DESCRIPTION OF THE INVENTION

The electrical switching device is a so-called power switch, which is provided in a multiphase embodiment. The invention may also be used in the case of single-pole, two-pole etc. switching devices. In the present case, the electrical switching device comprises three switching poles L1, L2, L3, which are constructed essentially identically. The switching poles L1, L2, L3 respectively comprise a movable switching contact piece 2 and also a fixed switching contact piece 3. In order to be able to perform a switching procedure using the electrical switching device, a relative movement between the respective movable and fixed switching contact pieces 2, 3 is to be performed. A common drive device 4 is provided in order to provide the necessary drive energy. The common drive device 4 is by way of example an electro-dynamic drive, a hydraulic drive or a so-called spring-operated drive. The movement is transmitted via a kinematic chain 5, said movement being output by the common drive device 4 and distributed as far as the movable switching contact pieces 2 of the switching poles L1, L2, L3. It is possible by means of distributing the movement via the kinematic chain 5 from the common drive device 4 to the multiple switching poles L1, L2, L3 to omit separate drive devices for each of the switching poles L1, L2, L3.

With reference to the switching pole L2 from now on initially the construction of a switching pole is to be described in an exemplary manner. The switching poles L1, L2, L3 in this case are constructed identically. The switching pole L2 comprises a first encapsulation housing 6. The first encapsulation housing 6 is embodied in an essentially hollow cylindrical manner, wherein an electrically insulating material is provided on the cladding side, by way of example it is possible in this case to use a ceramic or an organic composite material. If the switching poles L1, L2, L3 are used in an outdoor installation, it is possible to provide a shielding 7 on the cladding side (cf. FIGS. 4 and 5) in order to extend creepage distances. The shielding may be embodied on the outer cladding-side by means of a silicone coating by way of example in the case of using a fiberglass-reinforced base body in order to embody the first encapsulation housing 6. The hollow cylindrical base body of the first encapsulation housing 6 is closed in a fluid-tight manner on the end face side using a first and also a second electrically conductive closing element 8a, 8b.

A second encapsulation housing 9 is arranged in the interior of the first encapsulation housing 6. The second encapsulation housing 9 is constructed in a similar manner to the first encapsulation housing 6. The use of a hollow cylindrical base body is also provided here, which is formed essentially from insulating material. A ceramic may preferably be provided as insulating material. Where applicable, further electrodes or similar may also be located on the second encapsulation housing 9 (and/or on the first encapsulation housing 6). The second encapsulation housing 9 is mounted in a fixed manner spaced with respect to the first encapsulation housing 6 in the interior of said first encapsulation housing. The end sides of the second encapsulation housing 9 are closed in a fluid-tight manner similar to the first encapsulation housing 6 using a first and a second electrically conductive closing element 10a, 10b.

The fixed switching contact piece 3 sits on a stem, which is connected in a fixed manner to the first electrically conductive closing element 10a of the second encapsulation housing 9. Accordingly, the fixed switching contact piece 3 is held relative to the second encapsulation housing 9 in a fixed manner. Furthermore, the first electrically conductive closing element 10a of the second encapsulation housing 9 is connected in an electrically conductive and angular-fixed manner to the first electrically conductive closing element 8a of the first encapsulation housing 6 with the result that an electrical contacting arrangement ⌇ of the electrical fixed switching contact piece 3 may be provided via the first electrically conductive closing element 8a of the first encapsulation housing 6.

The movable switching contact piece 2 sits on a stem, which penetrates the second electrically conductive closing element 10b of the second encapsulation housing 9. An electrical contacting arrangement ⌇ of the stem that supports the movable switching contact piece 2 is provided outside of the second encapsulation housing 9 and within the first encapsulation housing 6, wherein a terminal lug is guided outwards through an electrically insulating wall of the first encapsulation housing 6. As a consequence, it is possible to integrate the switching paths that are located between the two switching contact pieces 2, 3 in an electro-energy transmitting network.

In order to render it possible to guide the stem through in a fluid-tight manner, said stem supporting the movable switching contact piece 2, a folding bellows 11 is provided, which extends concentrically around the stem (drive rod) of the movable switching contact piece 2 and is connected on the inside to the second electrically conductive closing element 10b. During a relative movement of the movable switching contact piece 2 with respect to the second encapsulation housing 9, a fluid-tight closure of the interior of the second encapsulation housing 9 is provided with respect to the interior of the first encapsulation housing 6.

In order to be able to transmit a movement to the movable switching contact piece 2, a contact pressure spring 12 is arranged in the kinematic chain 5, said contact pressure spring being arranged within the first encapsulation housing 6. An electrically insulating region of a drive rod 13 connects to the contact pressure spring 12. By way of example, the drive rod 13 may comprise at least in sections fiberglass-reinforced synthetic material. However, in sections the drive rod 13 may also comprise electrically conductive sections (for example stem). This is in particular then advantageous if a fluid-tight connection is to be embodied.

A reversibly deformable section 14 is preferably connected in the form of a bellows in a fluid-tight manner to the second electrically conductive closing element 8b of the first encapsulation housing 6. The reversibly shape-modifiable section 14 is connected in a fluid-tight manner to a fluid-tight section, in this case a metal section of the drive rod 13, in order to close the first encapsulation housing 6 in a fluid-tight manner. The drive rod 13 is guided in a linear manner in a collar 15 of the first encapsulation housing 6.

The interior of the first encapsulation housing 6 is filled with an electrically insulating fluid preferably in gas form. The electrically insulating fluid in this case comprises a higher pressure with respect to the surrounding area of the switching pole L2. Typically, the surrounding area of the switching pole L2 is at atmospheric pressure. The electrically insulating fluid that is arranged in the interior of the first encapsulation housing 6 is prevented from escaping owing to the fluid-tight embodiment of the first encapsulation housing 6. By way of example, sulfur hexafluoride, fluorinated ketones, fluoronitriles, nitrogen, carbon dioxide, technical air etc. and mixtures having materials of this type and also further material groups that contain fluoride may be used as electrically insulating fluids.

The second encapsulation housing 9 is provided with a reduced pressure in its interior. The reduced pressure may correspond by way of example to a vacuum. In the sense of this description, a vacuum is also understood as a fluid since in general a residual portion of charge carriers is present.

The pressure in the interior of the second encapsulation housing 9 in this case is reduced with respect to the pressure in the interior of the first encapsulation housing 6. The pressure in the interior of the second encapsulation housing 9 is also reduced with respect to the pressure of the surrounding area of the first encapsulation housing 6.

The folding bellows 11 and also the reversibly deformable section 14 in this case are formed in such a manner that the movements occur inversely. In other words, extending the folding bellows 11 leads to a compression of the reversibly deformable section 14 and vice versa.

In order to be able to distribute a movement from the common drive device 4, a distribution transmission is provided on the switching pole L2, said distribution transmission comprising a pivotable fixed lever 16 having three lever arms. The first lever arm 16a of the fixed lever 16 is connected to the common drive device 4. In the present case, the common drive device 4 grips on the fixed lever 16 from a vertical direction. Depending upon the embodiment variant of the electrical switching device, the direction from which a drive device is gripped may vary. The drive device may be gripped by way of example also from a horizontal or another arbitrary direction. A rotary movement may be coupled to the fixed lever 16 via the first lever arm 16a. Furthermore, a second lever arm 16b is provided, which is used to distribute the drive movement of the common drive device 4 via a rod 17a, 17b to the adjacent switching poles L1, L3. The third lever arm 16c is used to couple a movement via a coupling 18 to the linear movable drive rod 13. The third lever arm 16c and also the coupling 18 therefore form a knee lever transmission by means of which it is possible to convert a rotary movement of the fixed lever 16 into a linear movement of the drive rod 13. In a similar manner to the fixed lever 16 of the switching pole L2, identical fixed levers 16 are provided on the adjacent switching poles L1, L3, said levers respectively comprising a correspondingly-acting second lever arm 16b and also third lever arm 16c and provide a movement for the movable switching contact pieces 2 of the adjacent switching poles L1, L3 via respectively a coupling 18.

Figure 1:
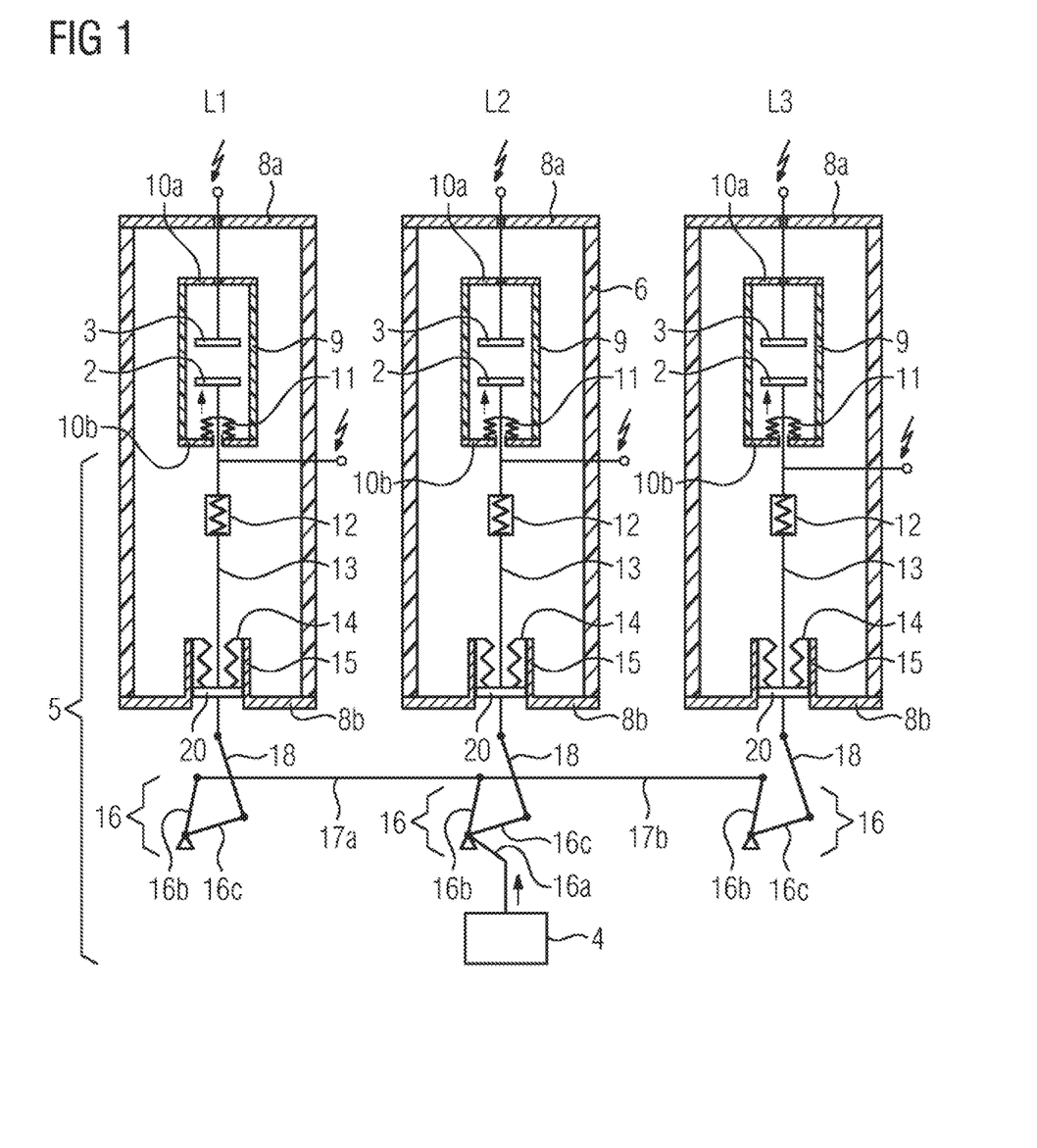
FIG. 1: illustrates a section through a schematized electrical switching device in the switched-off state.

The switched-off state of the electrical switching device is illustrated in FIG. 1, in other words the fixed switching contact pieces 3 are arranged spaced with respect to the movable switching contact pieces 2. An opened switching path is to be noted between the two switching contact pieces 2, 3 of the respective switching pole L1, L2, L3. In order to generate a switching-on movement (cf. arrows on the common drive device 4 and also on the movable switching contact pieces 2) a movement is coupled via the first lever arm 16a to the fixed lever 16. The fixed lever 16 rotates counterclockwise. The second lever arm 16b and also the third lever arm 16c are moved with said lever. A switching-on movement is transmitted to the drive rod 13 via the coupling 18 and from there triggers a movement of the movable switching contact piece 2 via interconnection of the contact pressure spring 12. The movement of the fixed lever 16 of the switching pole L2 is also transmitted to the fixed lever 16 of the adjacent switching poles L1, L3 in a similar manner owing to the rod 17a, 17b, wherein the movement there is also transmitted via respectively a coupling 18 to the respective movable switching contact piece 2. A contacting arrangement of the movable switching contact pieces 2 to the respective fixed switching contact piece 3 (FIG. 2) occurs with a progression of the switching-on movement. In this case, the respective bellows 11 extends and also the reversibly deformable section 14 compresses. In order to generate a sufficient contact pressure force, using a galvanic physical contacting arrangement of the respective switching contact pieces 2, 3 of the respective switching pole L1, L2, L3 a movement of the common drive device 4 is also continued with the result that the contact pressure spring 12 is stressed in the kinematic chain. The knee lever transmission having the coupling 18 and also said third lever arm 16*c* is brought in an ideal manner into the extended position with the result that the contact pressure spring 13 generates a sufficient pressing force (FIG. 3).

The switching-on procedure is now terminated. During a switching-on procedure, a movement is supported by means of a compensation of the pressures owing to the pressure ratios within the first encapsulation housing 6 and also within the second encapsulation housing 9. In an ideal case, the pressures in the interior of the first encapsulation housing 6 and also in the interior of the second encapsulation housing 9 for the most part may compensate with the result that a drive force, which has to perform the movement of the kinematic chain 5 does not need to be loaded as a result of additional procedures of overcoming pressure differences.

Figure 2:
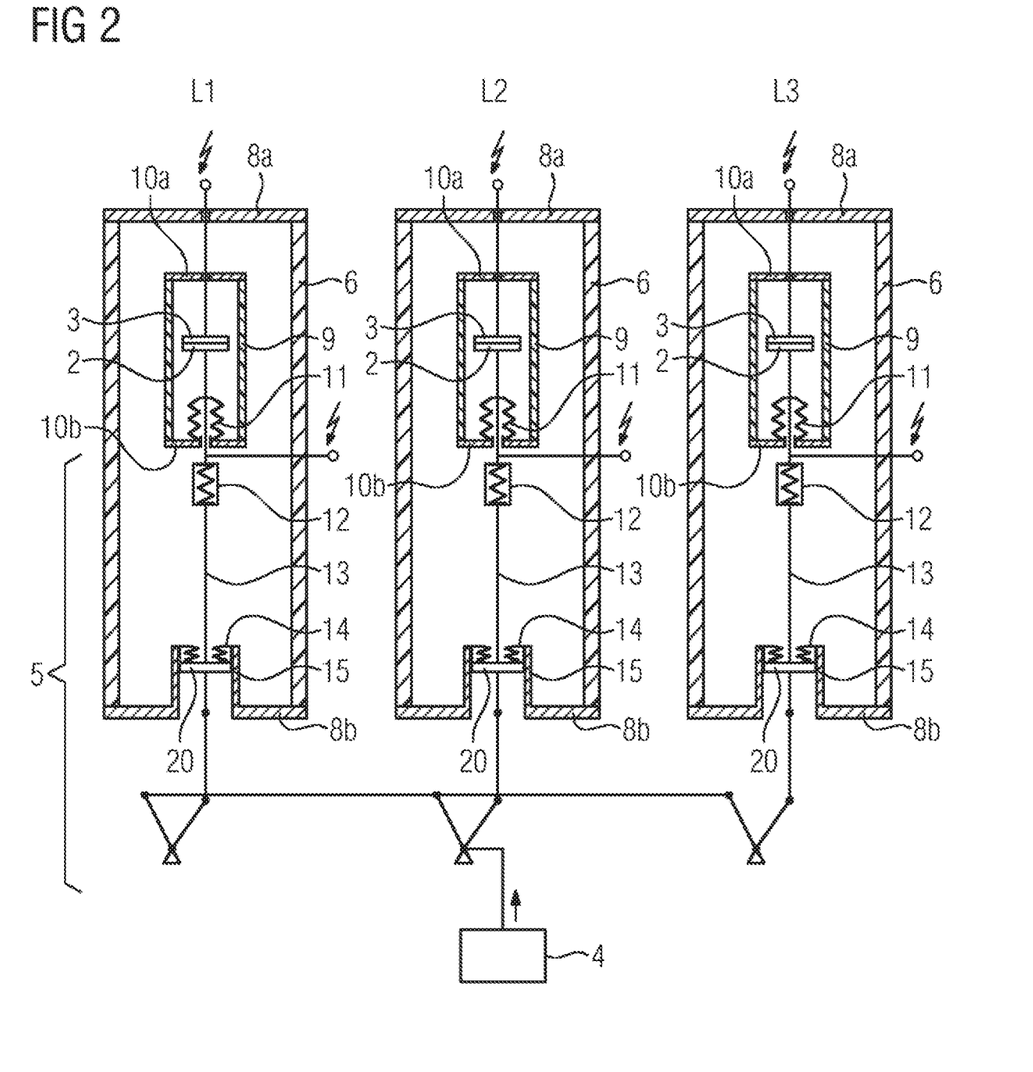
FIG. 2: illustrates the electrical switching device that is disclosed in FIG. 1 in an intermediate state.
Figure 3:
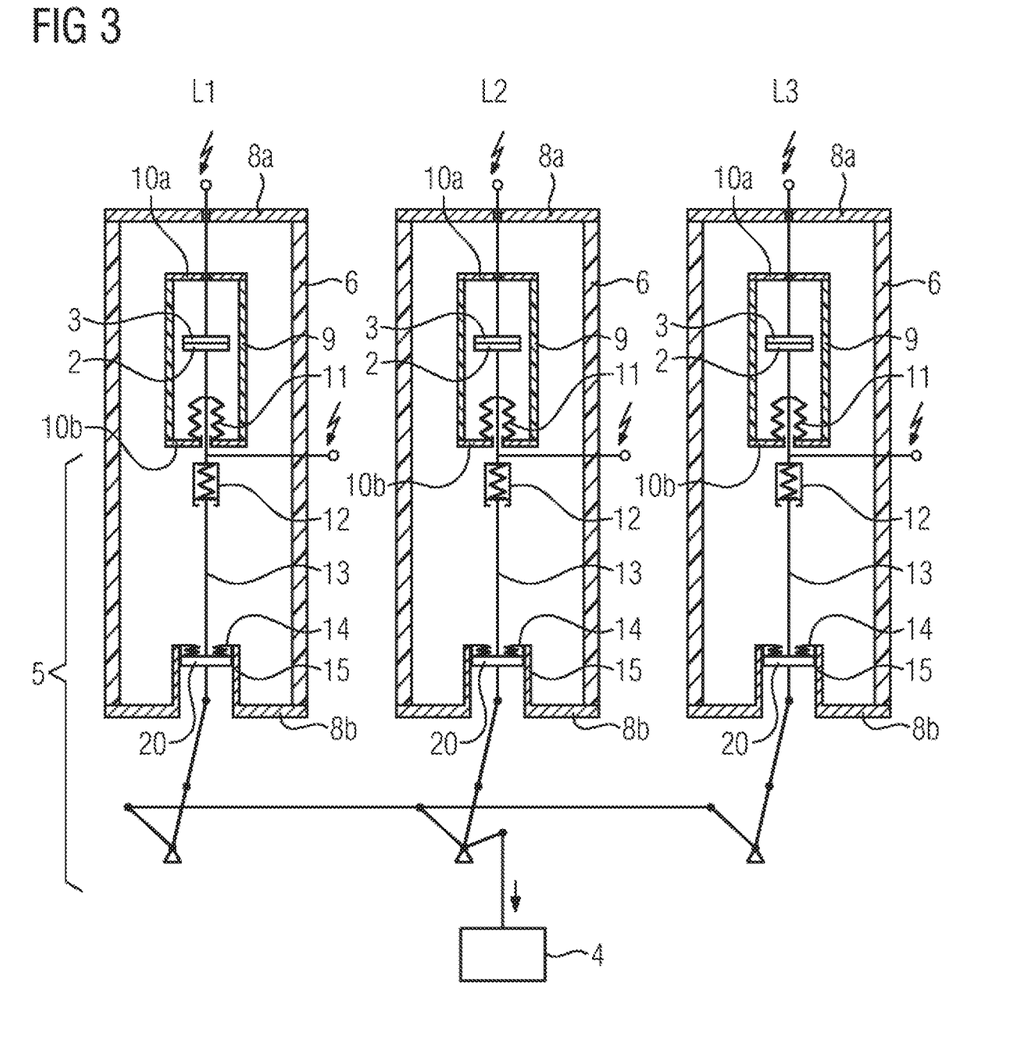
FIG. 3: illustrates the electrical switching device that is disclosed in FIGS. 1 and 2 in the switched-on state.

During a switching-off procedure, the movement sequence as illustrated in FIGS. 1, 2 and 3 is reversed. Starting from FIG. 3, the fixed lever 16 is moved clockwise, wherein the extended position of the slider crank transmission is triggered. Initially, the contact pressure spring 12 relaxes whereupon the movable switching contact piece 2 is removed from the fixed switching contact piece 3 with sufficient relaxation of the contact pressure spring 12 (cf. arrows FIG. 3). The switched-off state of the electrical switching device is achieved when reaching the position as illustrated in FIG. 1.

Figure 4:
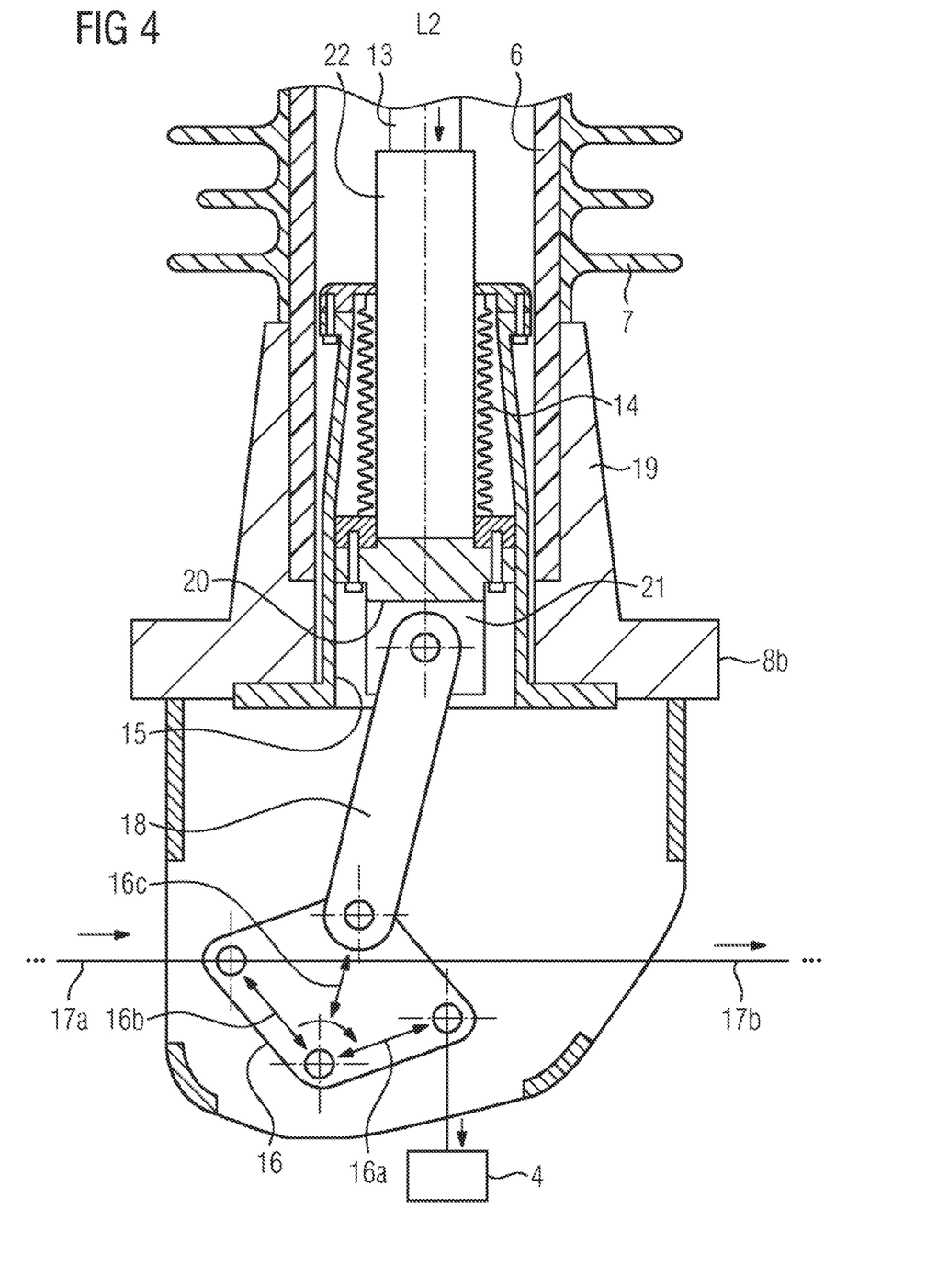
FIG. 4: illustrates a section through a switching pole of the electrical switching device in the switched-on state.
Figure 5:
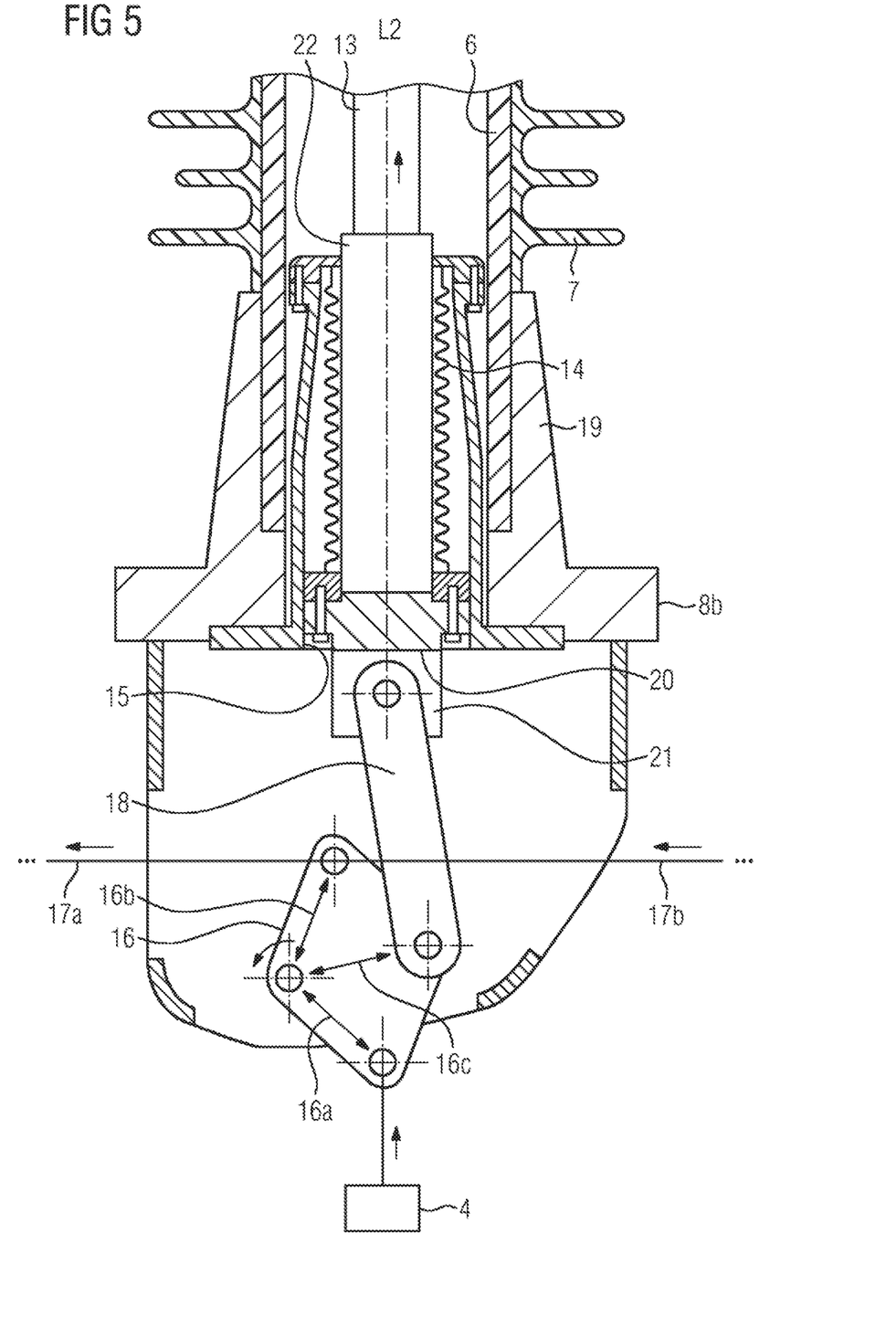
FIG. 5: illustrates the section as disclosed in FIG. 4 in the switched-off state of the electrical switching device.

A constructive embodiment of the fixed lever 16 having a knee lever transmission and also the embodiment of the reversibly deformable section 14 are described in an exemplary manner with the aid of FIGS. 4 and 5 starting from the schematic illustration of the FIGS. 1, 2 and 3.

FIGS. 4 and 5 illustrate respectively a section of the first encapsulation housing 6 of a switching pole L2 and namely in the region of the second electrically conductive closing element 8*b*. A section of the first encapsulation housing 6 is illustrated in FIG. 4 in an exemplary manner. The first encapsulation housing 6 comprises a hollow cylindrical electrically insulating base body and the outer sides of said base body are provided with a shielding 7 with the result that a creepage path is extended along the surface of the first encapsulation housing 6. In order to embody the second electrically conductive closing element 8*b*, this closing element is embodied in multiple parts. The second electrical closing element 8*b* comprises a flange fitting 19. The flange fitting 19 is placed on the end face side on the first encapsulation housing 6 on the outer cladding side in a shape-complementing manner and adjoins the shielding 7, which is formed by way of example by means of silicone. A fluid-tight connection is provided by way of example by means of bonding or cementing the flange fitting 19 on the outer cladding surface of the tubular base body of the first encapsulation housing 6. The flange fitting 19 provides a flange opening into which a collar 15 protrudes. The collar 15 is fitted with an annular flange with the result that the annular flange may be used centered in a shape-complementary recess of the flange fitting 19. The collar 15 and also the flange fitting 19 may be fixed by way of example by means of a screwing arrangement with the result that a fluid-tight connection between the flange fitting 19 and the annular flange of the collar 15 is formed. Accordingly, the collar 15 and also the flange fitting 19 are part of the second electrically conductive closing element 8*b* of the first encapsulation housing 6.

The collar 15 protrudes in a pipe-socket manner into the hollow cylindrical recess of the first encapsulation housing 6. In this case, the collar 15 is oriented essentially coaxially with respect to the movement axis of the drive rod 13. The collar 15 grips the drive rod 13 on the outer cladding-side. The drive rod 13 comprises a fluid-tight section 20. The fluid-tight section 20 in the present case is formed from a metal and formed in such a manner that this fluid-tight section forms a piston on the drive rod 13 and the piston wall of said piston may be displaced in a sliding manner in the collar 15. As a consequence, a linear guiding arrangement of the drive rod 13 is provided in the collar 15. The fluid-tight section 20 in the present case is formed from a metal. Where applicable, a sliding element, by way of example a piston ring of for example polytetrafluoroethylene, may be arranged on the outer periphery so as to reduce the friction. The fluid-tight section 20 of the drive rod 13 is furthermore provided with a lug 21 to which the coupling 18 of the knee lever transmission of the kinematic chain is fastened in a rotatable manner. The reversibly deformable section 14 in the present case is embodied according to a type of folding bellows, which essentially comprises a straight hollow cylindrical shape. In this case, the cladding is embodied in a manner that is corrugated many times in order to support a reversible deformation in the direction of the movement axis of the drive rod 13. The end faces of the bellows-shaped reversibly deformable section 14 are respectively connected to screw flanges in a fluid-tight manner with the result that the one end face of the reversibly deformable section 14 is connected on the end face side to the section of the collar 15, which protrudes freely into the interior of the encapsulation housing 6. The screw flange is screwed there in a fluid-tight manner via bolts. The opposite end face side end of the reversibly deformable section 14 is connected in a fluid-tight manner via the screw flange at this location to the fluid-tight section 20 of the drive rod 13. As a consequence, a fluid-tight connection to the free end of the collar 15 is provided between the fluid-tight section 20 while being encompassed by a section of the drive rod 13. The collar 15 is consequently part of the fluid-tight barrier, which closes the first encapsulation housing 6 in a fluid-tight manner. Furthermore, the collar 15 is used as a linear guiding arrangement of the drive rod 13. A pocket is formed on the first encapsulation housing 6 via the collar 15, said pocket protruding downwards into the first encapsulation housing 6. The depth of the pocket may be embodied in a variable manner (cf. position of the fluid-tight section 20 in the FIGS. 4 and 5) owing to the ability of the fluid-tight section 20 of the drive rod 13 to be displaced. The fluid-tight section 20 forms a modifiable partition in the pocket.

The section of the switching rod 13 that is encompassed by the reversibly deformable section 14 is advantageously formed from an electrically insulating material, which is connected in an angular-fixed manner to the fluid-tight section 20. In order to prevent mechanical damage to the encompassed section of the drive rod 13 or to prevent damage to the reversibly deformable section 14, a bellows protection 22 is arranged in the gap between the drive rod 13 and also the reversibly deformable section. The bellows protection 22 is connected in an angular-fixed manner to the drive rod 13. It is preferred that the bellows protection 22 is selected to be dimensioned in such a manner that convex sections of the corrugation that are located on the inner cladding side on the reversibly deformable section 14 lie on the cladding side on the bellows protection 22 and slide along on the bellows protection 22 during a deformation. As a consequence, an improved guiding arrangement of the reversibly deformable section 14 is provided during a deformation of said section.

FIG. 4 illustrates the switched-on state of the switching pole L2 of the electrical switching device. The movable switching contact piece 2 is pressed against the fixed switching contact piece 3 under compression of the contact pressure spring 12. During a movement of the fixed lever 16 in the clockwise direction, the knee lever transmission is initially moved out of its extended position and the contact pressure spring 12 is relaxed. After the relaxation of the contact pressure spring 12, the switching rod 13 is displaced via the coupling 18 in the direction of the fixed lever 16 under further continuation of the movement of the fixed lever 16 in the clockwise direction. In this case, the reversibly deformable section 14 is relaxed, in other words the reversibly deformable section 14 is extended. An identical movement is also transmitted to the fixed lever 16 of the adjacent switching poles L1, L3 via the rods 17a, 17b. It is preferred that the kinematic chains are identical in their construction both in the switching pole L2 as well as in the adjacent switching poles L1, L3. FIG. 5 illustrates the switched-off state of the switching pole L2. In other words, the contact pressure spring 12 is relaxed. The reversibly deformable section 14 is extended. The pocket that is formed on the collar 15 is almost eliminated by means of the displacement of the drive rod 13. Starting from FIG. 5 the switching pole L2 is now ready for a switching-on procedure in a similar manner to the adjacent switching poles L1, L3.

In the case of the embodiment variant in accordance with FIGS. 4 and 5, it is provided that the reversibly deformable section 14 on the first encapsulation housing 6 and also the bellows 11 on the second encapsulation housing 9 are inversely subjected to extending or compressing. As a consequence, forces that are necessary in order to extend or compress the linear seals 11, 14 are at least in part mutually cancelled. The drive energy, which is to be provided by the common drive device 4, may therefore be reduced. A switching movement may be supported by means of choosing the pressure ratios in the interior of the first encapsulation housing 6 and also in the interior of the second encapsulation housing 9. In this case, the pressure in the interior of the first encapsulation housing 6 should be higher than the pressure in the interior of the second encapsulation housing 9. The pressure that surrounds the switching poles L1, L2, L3 should be lower than the pressure in the interior of the first encapsulation housing 6 however should be higher than the pressure in the interior of the second encapsulation housing 9.

The invention claimed is:

1. An electrical switching device assembly, comprising:
a drive device outputting a drive movement;
a plurality of switching poles each including:
a switching contact piece;
a first encapsulation housing surrounding said switching contact piece, said first encapsulation housing including a flange opening and a collar protruding into said flange opening;
a kinematic chain for driving said switching contact piece, said kinematic chain fluid-tightly penetrating said first encapsulation housing in a linearly movable manner, said kinematic chain being guided at said first encapsulation housing in the linearly movable manner and said kinematic chain being detached from and guided along within said collar in a linearly displaceable manner;
a moveable drive rod connected to said switching contact piece for transferring the drive movement from said kinematic chain to said switching contact piece;
a reversibly deformable section linearly sealing said kinematic chain at said first encapsulation housing, said reversibly deformable section extending between said drive rod and said collar; and
said kinematic chain including a pivoting fixed lever having a first lever arm connected to said drive device, a second lever arm for distributing said drive movement of said drive device, a third lever arm, a coupling connecting said third lever arm to said moveable drive rod of one of said switching poles, and a rod distributing the drive movement from said second lever arm to said drive rod of others of said switching poles.

2. The electrical switching device assembly according to claim 1, wherein said drive rod is guided at said first encapsulation housing in the linearly movable manner.

3. The electrical switching device assembly according to claim 2, wherein said first encapsulation housing includes said collar in which said drive rod is guided in the linearly displaceable manner.

4. The electrical switching device assembly according to claim 2, wherein said kinematic chain includes a knee lever transmission controlling said drive rod.

5. The electrical switching device assembly according to claim 4, wherein said knee lever transmission of said kinematic chain is in an extended position in a switched-on state of the electrical switching device.

6. The electrical switching device assembly according to claim 1, wherein said reversibly deformable section is a bellows.

7. The electrical switching device assembly according to claim 1, wherein said collar is part of a pocket in said first encapsulation housing.

8. The electrical switching device assembly according to claim 7, wherein said pocket includes a modifiable partition.

9. The electrical switching device assembly according to claim 1, wherein said drive rod, said reversibly deformable section and said collar are oriented coaxially relative to one another.

10. The electrical switching device assembly according to claim 1, which further comprises a bellows guiding arrangement disposed between said reversibly deformable section and at least one of said drive rod or said collar.

11. The electrical switching device assembly according to claim 1, which further comprises a second encapsulation housing surrounded by said first encapsulation housing, a first pressure prevailing in said first encapsulation housing, a second pressure prevailing in said second encapsulation housing, and said first and second pressures differing from one another.

12. The electrical switching device assembly according to claim 1, which further comprises a second encapsulation housing surrounded by said first encapsulation housing, a first pressure prevailing in said first encapsulation housing, a second pressure prevailing in said second encapsulation housing, and said first pressure being higher than or identical to said second pressure.

13. The electrical switching device assembly according to claim 1, which further comprises a second encapsulation housing surrounded by said first encapsulation housing, a first pressure prevailing in said first encapsulation housing, a second pressure prevailing in said second encapsulation housing, and a pressure surrounding said first encapsulation housing is lower than or identical to said first pressure, and said pressure surrounding said first encapsulation housing being higher than or identical to said second pressure.

* * * * *